United States Patent
Horton et al.

(10) Patent No.: US 9,493,215 B2
(45) Date of Patent: Nov. 15, 2016

(54) FLOATING DEBRIS HARVESTING SYSTEM

(71) Applicant: Liquid Waste Technology, LLC, New Richmond, WI (US)

(72) Inventors: Ryan Patrick Horton, Kansas City, MO (US); Michael Todd Young, Bonner Springs, KS (US); Victor J. Tirado, New Richmond, WI (US)

(73) Assignee: Liquid Waste Technology, LLC, New Richmond, WI (US)

( * ) Notice: Subject to any disclaimer, the term of this patent is extended or adjusted under 35 U.S.C. 154(b) by 209 days.

(21) Appl. No.: 14/302,108

(22) Filed: Jun. 11, 2014

(65) Prior Publication Data

US 2014/0367342 A1    Dec. 18, 2014

Related U.S. Application Data

(60) Provisional application No. 61/834,366, filed on Jun. 12, 2013.

(51) Int. Cl.
| | |
|---|---|
| *E02B 15/04* | (2006.01) |
| *B63B 35/32* | (2006.01) |
| *E02B 15/10* | (2006.01) |
| *A01D 44/00* | (2006.01) |

(52) U.S. Cl.
CPC ............. *B63B 35/32* (2013.01); *E02B 15/046* (2013.01); *E02B 15/104* (2013.01); *A01D 44/00* (2013.01)

(58) Field of Classification Search
CPC .... E02B 15/046; E02B 15/10; E02B 15/103; E02B 15/104; B63B 35/32; A01D 44/00
USPC ........ 210/747.6, 776, 170.05, 170.09, 170.1, 210/170.11, 242.1, 242.3; 56/8, 9
See application file for complete search history.

(56) References Cited

U.S. PATENT DOCUMENTS

| | | | | |
|---|---|---|---|---|
| 3,219,190 | A * | 11/1965 | Thune | E02B 15/046 210/242.3 |
| 3,623,609 | A * | 11/1971 | Ainlay | E02B 15/104 210/242.3 |
| 3,643,804 | A * | 2/1972 | Sharpton | E02B 15/104 210/242.4 |
| 3,973,866 | A | 8/1976 | Vaughan | |
| 4,085,049 | A * | 4/1978 | Hartwick | E02B 15/106 210/242.3 |
| 4,100,072 | A * | 7/1978 | Uchida | B63B 35/32 210/242.3 |
| 4,456,536 | A * | 6/1984 | Lorenz | E02B 15/103 210/242.3 |
| 4,840,384 | A | 6/1989 | Dorsch | |
| 4,842,479 | A | 6/1989 | Dorsch | |
| 5,030,363 | A * | 7/1991 | Pole | E02B 15/103 210/776 |
| 5,043,064 | A * | 8/1991 | Abell | E02B 15/103 210/242.1 |

(Continued)

*Primary Examiner* — Christopher Upton
(74) *Attorney, Agent, or Firm* — Hovey Williams LLP (57) ABSTRACT

An apparatus for removing floating waterbourne debris. The apparatus includes a capture section comprising a carrier and a motive member mounted on the carrier, with the motive member adapted to contact and direct floating debris rearwardly. The apparatus further includes a collection and pumping section positioned rearward of the capture section for collecting and removing debris directed from the capture section. The collection and pumping section includes a hopper having opposed first and second ends, the first end thereof positioned adjacent the motive member and comprising an opening adapted to receive debris directed by the motive member, and the second end presenting a port for passing debris therethrough, and a pump mounted to the hopper adjacent the port and in fluid communication with the hopper for transporting the debris received from the hopper to a remote location.

20 Claims, 7 Drawing Sheets

(56) References Cited

U.S. PATENT DOCUMENTS

| | | |
|---|---|---|
| 5,076,757 A | 12/1991 | Dorsch |
| 5,404,696 A * | 4/1995 | Vasby ............... A01D 44/00 56/8 |
| 5,456,580 A | 10/1995 | Dorsch |
| 5,460,482 A | 10/1995 | Dorsch |
| 5,460,483 A | 10/1995 | Dorsch |
| 5,481,856 A | 1/1996 | Wickoren et al. |
| 5,782,660 A * | 7/1998 | Brickell ............... B63H 5/02 440/36 |
| 7,125,221 B2 | 10/2006 | Dorsch et al. |
| 7,841,550 B1 | 11/2010 | Dorsch et al. |
| 8,105,017 B2 | 1/2012 | Dorsch et al. |
| 9,060,464 B2 * | 6/2015 | Horton ............... A01D 44/00 |
| 2010/0147781 A1 * | 6/2010 | Newman ............ A01D 44/00 210/776 |

\* cited by examiner

ic embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FLOATING DEBRIS HARVESTING SYSTEM

RELATED APPLICATION

This non-provisional patent application claims priority benefit, with regard to all common subject matter, of earlier filed U.S. Provisional Patent Application No. 61/834,366, filed Jun. 12, 2013, and entitled "FLOATING DEBRIS HARVESTING SYSTEM." The identified earlier-filed provisional patent application is hereby incorporated by reference in its entirety into the present non-provisional application.

BACKGROUND OF THE INVENTION

1. Field of the Invention

The present invention relates to systems for collecting and macerating debris found on waterways. More particularly, it is related to a system adapted for mounting on a watercraft to direct debris to a pump whereby floating debris may be collected and pumped to a remote location where liquids may be separated from the debris and further processed.

2. Description of the Related Art

The collection and processing of debris in waterways and other bodies of water has become a matter of increasing importance to preserve the appearance and reduce pollution, as well as to aid in safe navigation. Heretofore, specialized watercraft have been employed for removing surface oil (known colloquially as skimmers) and for dredging operations. For example, U.S. Pat. No. 5,481,856, entitled "METHOD AND APPARATUS FOR CUTTING AQUATIC VEGETATION," discloses a watercraft having a cutterhead specifically adapted for cutting aquatic weeds and pumping the harvested vegetation to a remote location.

However, there has developed a need for a debris harvesting system which can be used on watercraft which will effectively collect and pump debris floating on the surface of the water. Such surface debris is difficult to capture by existing methods.

SUMMARY OF THE INVENTION

The present invention meets the need for an improved waterborne debris collection system. The floating debris harvesting system hereof may be mounted to watercraft, so as to efficiently collect floating debris and deliver it to a pumping system where it may be directed to a barge or onshore collection station for dewatering and disposal.

Broadly speaking, the present invention may include a capture section and a collection and pumping section. The collection and pumping section may include a hopper and a pump mounted to the hopper for pumping liquid such as water and solid debris carried with the liquid to a remote collection station. The collection and pumping section may be movably mounted to the watercraft, for example on a boom which may be raised and lowered.

The capture section may include a motive member which directs floating debris toward the collection and pumping section. The capture section preferably includes a carrier for mounting the motive member ahead of the collection and pumping section with respect to the normal direction of travel. That is, the collection and pumping section is preferably positioned intermediate the watercraft and the motive member. The motive member may preferably include a plurality of rotatable radially extending and circumferentially spaced guides for permitting water to pass through the motive member but cause the floating debris to be directed toward the collection and pumping section. In particularly preferred embodiments, the guides may include perforate blades. Preferably, the capture section may include deflectors which extend from adjacent the motive member rearwardly to a location proximate the hopper. The deflectors may be imperforate, and serve to prevent the floating debris moved rearwardly by the motive member from moving outwardly to a position outside the area where the debris is captured by the collection and pumping station. Most preferably, the capture section is mounted to the watercraft independently of the collection and pumping section, whereby the collection and pumping station may be shifted relative to the surface of the water for optimal performance without necessitating movement of the capture section.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Referring now to the drawings, a floating debris harvesting system 10 in accordance with the present invention may be provided as a part of a watercraft 12 or added to an existing watercraft 12. The floating debris harvesting system 10 broadly includes a collection and pumping section 14 and a capture section 16.

With reference to FIGS. 1-7, the watercraft 12 may be any conventional watercraft, and in preferred forms may be a dredge having a catamaran-type hull configuration with two buoyant pontoons 18 and 20, an engine compartment 22, a cab 24 where the operator may be located, and a boom 26 which is positioned between the pontoons 18 and 20, for example as shown in U.S. Pat. Nos. 5,481,856 and 5,782,660, the entire disclosures of which are incorporated herein by reference. The watercraft 12 may be provided with its own propulsion system such as an inboard engine and forced water jet drive or a screw stern drive, or one or more outboard engines, or alternatively the watercraft propulsion system as shown in the aforementioned U.S. Pat. No. 5,782,660. Alternatively, the watercraft 12 may be positioned by the use of a plurality of cables and winches, with the cables anchored to the shore, pilings or the like whereby the position of the watercraft 12 on the water may be changed by lengthening and shortening the cables.

As may be best illustrated by FIGS. 1-3, 5, and 7, the boom 26 is preferably pivotally mounted near the stern of the watercraft 12 and supported near the bow of the watercraft 12 by a hoist 28 whereby the forward end of the boom 26 may be raised and lowered to an effective height relative to the surface of the water on which the watercraft 12 is supported. As such, because the boom 26 is connected to the collection and pumping section 14 near the boom's 26 forward end, the boom 26 is operable to raise and lower the collection and pumping section 14 relative to the surface of the water. A relatively large diameter hose or conduit (not shown) may be attached to the rear end of the boom 26 and used to convey water and collected debris to a remote collection site, such as a shore station or a barge.

With reference to figures, the collection and pumping section 14 broadly includes a hopper 30 and a pump 32. The pump 32 may be mounted between the hopper 30 and the forward end of the boom 26 whereby water and debris collected by the hopper 30 is channeled toward a port 34 preferably located at the center and rear of the hopper 30.

The pump 32 may be a centrifugal pump, and most preferably may be a solid waste or chopper pump. By way of example, such chopper pumps are sold by Vaughan Co., Inc. of Montesano, Wash., USA and are shown and described in U.S. Pat. Nos. 3,973,866, 4,840,384, 4,842,479, 5,076,757, 5,456,580, 5,460,482, 5,460,483, 7,125,221, 7,841,550 and 8,105,017, the entire disclosures of which are incorporated herein by reference.

Figure 6:
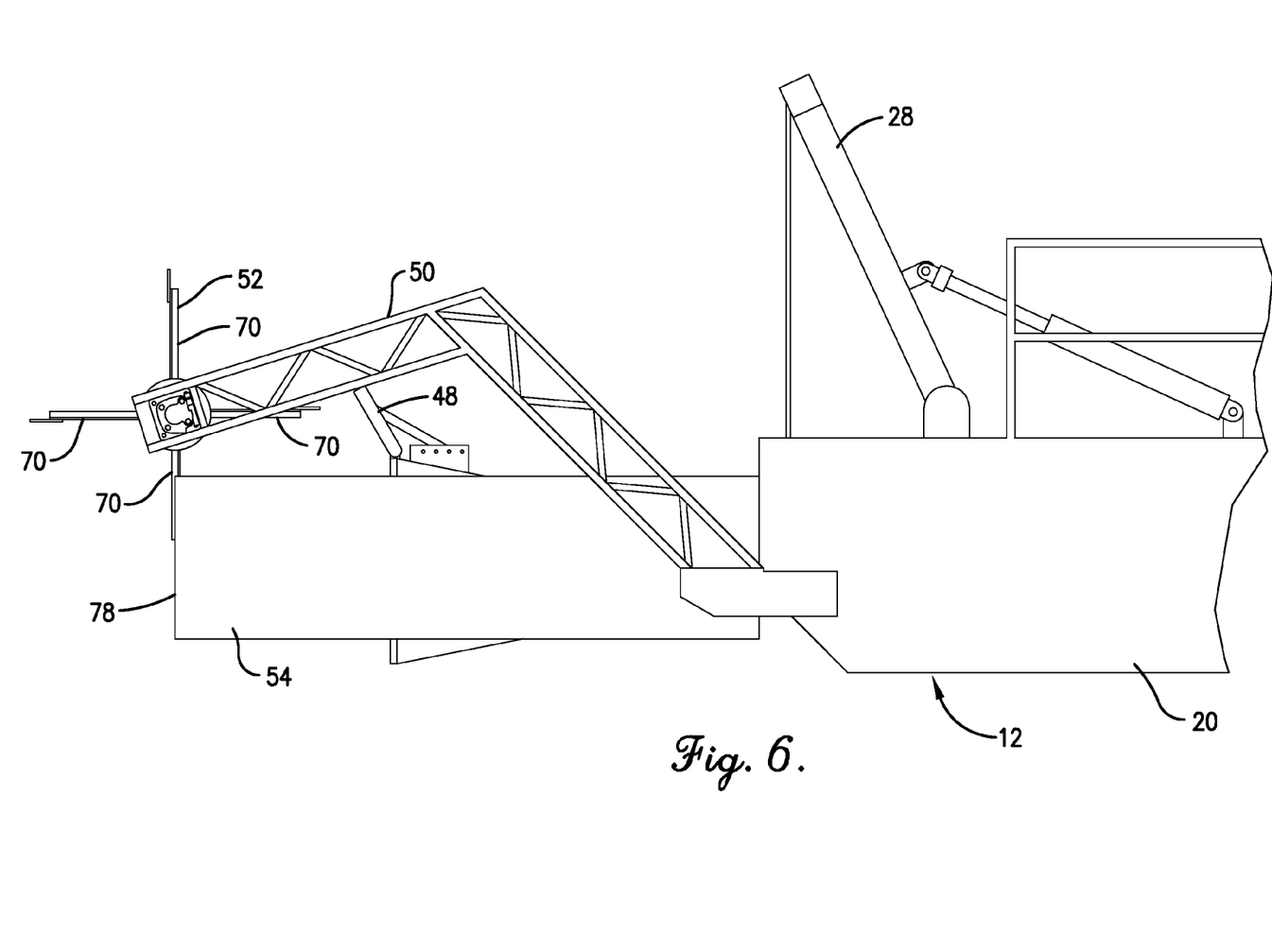
FIG. 6 is a fragmentary side elevational view of the watercraft similar to FIG. 4, showing an optional shield positioned on a top wall of the hopper.
Figure 7:
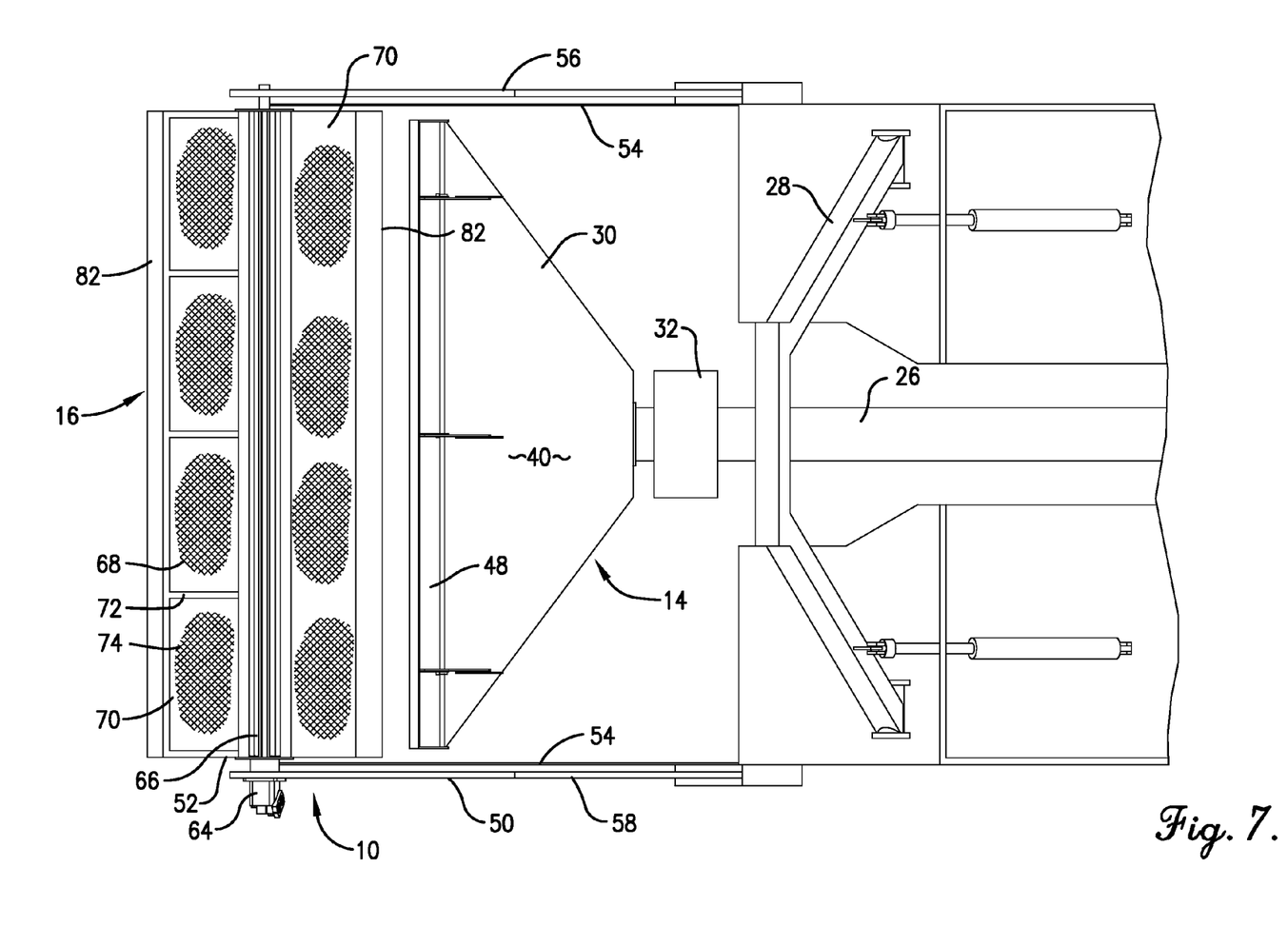
FIG. 7 is a fragmentary top plan view of the watercraft similar to FIG. 5, showing an optional shield positioned on a top wall of the hopper.

The hopper 30 may be made of corrosion-resistant material such as stainless steel or can be provided of steel or other material and provided with a coating which resists corrosion in marine or other harsh environments. The hopper 30 may be essentially funnel-shaped and extends forwardly of the pump 32 and acts as a funnel to collect and deliver debris through the port 34 to the pump 32. As such, and as best illustrate in FIGS. 2-3, the hopper 30 may be provided with sidewalls 36, bottom wall 38, top wall 40 and a backwall 42, with the backwall 42 including the port 34. The sidewalls 36, the bottom wall 38 and the top wall 40 may thus together provide a front margin 44 which presents a large opening to collect debris therein and deliver the debris to the pump 32 through the port 34. As shown, certain embodiments may provide for the opening defined from the front margin 44 to be larger than the port 34. Optionally, as shown in FIGS. 6 and 7, a pivotally and adjustably mounted shield 48 may be mounted on the top wall 40 of the hopper 30. The shield 48 may be used to impede debris engaged by the capture section 16 from passing over the hopper 30, and adjusted to deflect such debris downwardly according to the type of debris being encountered, while maintaining sufficient visibility for the operator in the cab 24.

Figure 1:
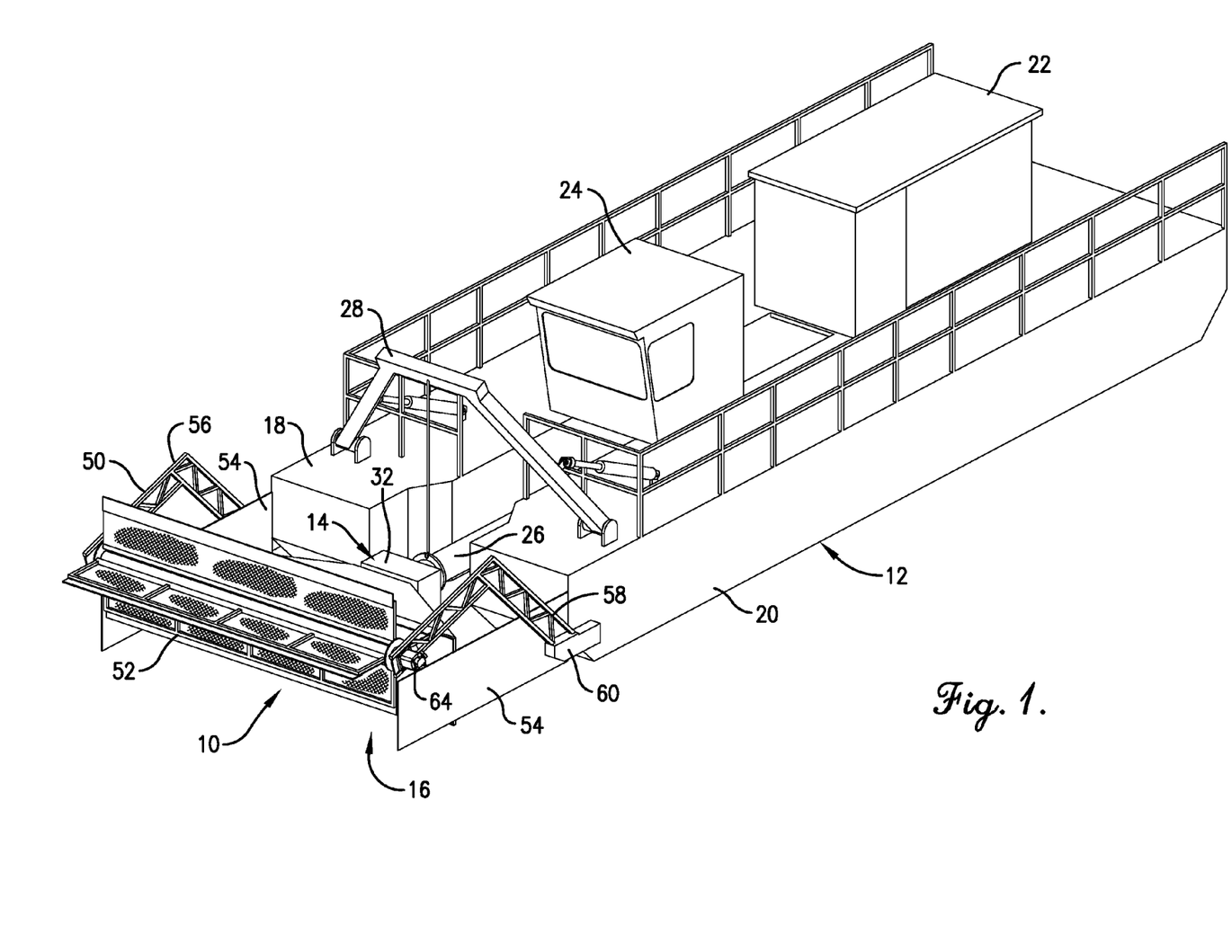
FIG. 1 is a top right front isometric view of a watercraft with a floating debris harvesting system in accordance with the present invention.

As shown in FIG. 1, the capture section 16 may broadly include a carrier 50, a motive member 52 and deflectors 54. The capture section 16 is preferably positioned independently of the collection and pumping section 14; that is, upward and downward movement of the boom 26 and thus the collection and pumping section 14 may be independent of the positioning of the capture section 16. The carrier 50 may include a pair of arms 56 and 58 which have proximate ends 60 which are mounted to the hull of the watercraft 12, the arms extending forwardly whereby the remote ends 62 of the arms are positioned forwardly past the front margin 44 of the hopper 30. The arms 56 and 58 may be fixedly mounted on the hull, as depicted in the drawings, or alternatively may be adjustably mounted as required to maximize removal of debris from the given environment being encountered. For instance, the arms 56 and 58 may be adjustably mounted on the hull so as to be operable to selectively move the motive member 52 relative to the surface of the water. For example, in some circumstances, it may be preferable for the motive member 52 to be positioned entirely out of the water, while in other circumstances, it may be preferable for the motive member 52 to be at least partially submerged beneath the surface of the water.

The arms 56 and 58 may each include bearings at the remote ends 62 and may include one or more motors, such as hydraulic motor 64, which serves to rotate the motive member 52. The motor 64 may have variable speeds, so that the motive member 52 can be rotated at different speeds as may be necessitated by the quantity and content of debris being encountered and processed. When hydraulic motors 64 are used, they may be powered by a suitable hydraulic pump in the engine compartment 22 via hydraulic hoses (not shown) and controlled by the operator in the cab 24, as is conventional.

As may be best illustrated by FIGS. 2-5 and 7, the motive member 52 may include a central shaft 66 extending along an axis of rotation transverse to and most preferably perpendicular to the generally fore-and-aft axis of the boom 26. The central shaft 66 is operatively connected to the hydraulic motors 64 for causing selective rotation of the motive member 52 according to control input by the operator in the cab 24. The motive member 52 may include a plurality of radially extending debris-engaging members, such as guides 68, which rotate with the shaft 66. Preferably, the lowermost of the guides 68 will engage the debris carried on the surface of the water and move it rearwardly toward the hopper 30, while permitting water engaged by the guides 68 to pass through the guides 68. Thus, in one preferred form of the invention hereof, the guides 68 may be a plurality of perforate panels 70 which extend radially from the shaft, are circumferentially spaced around the shaft, and extend substantially the lateral distance between the arms 56 and 58. The perforate panels 70 may be provided with a framework 72 with expanded metal screens 74 to engage the debris while permitting water to pass through the screens 74.

Figure 2:
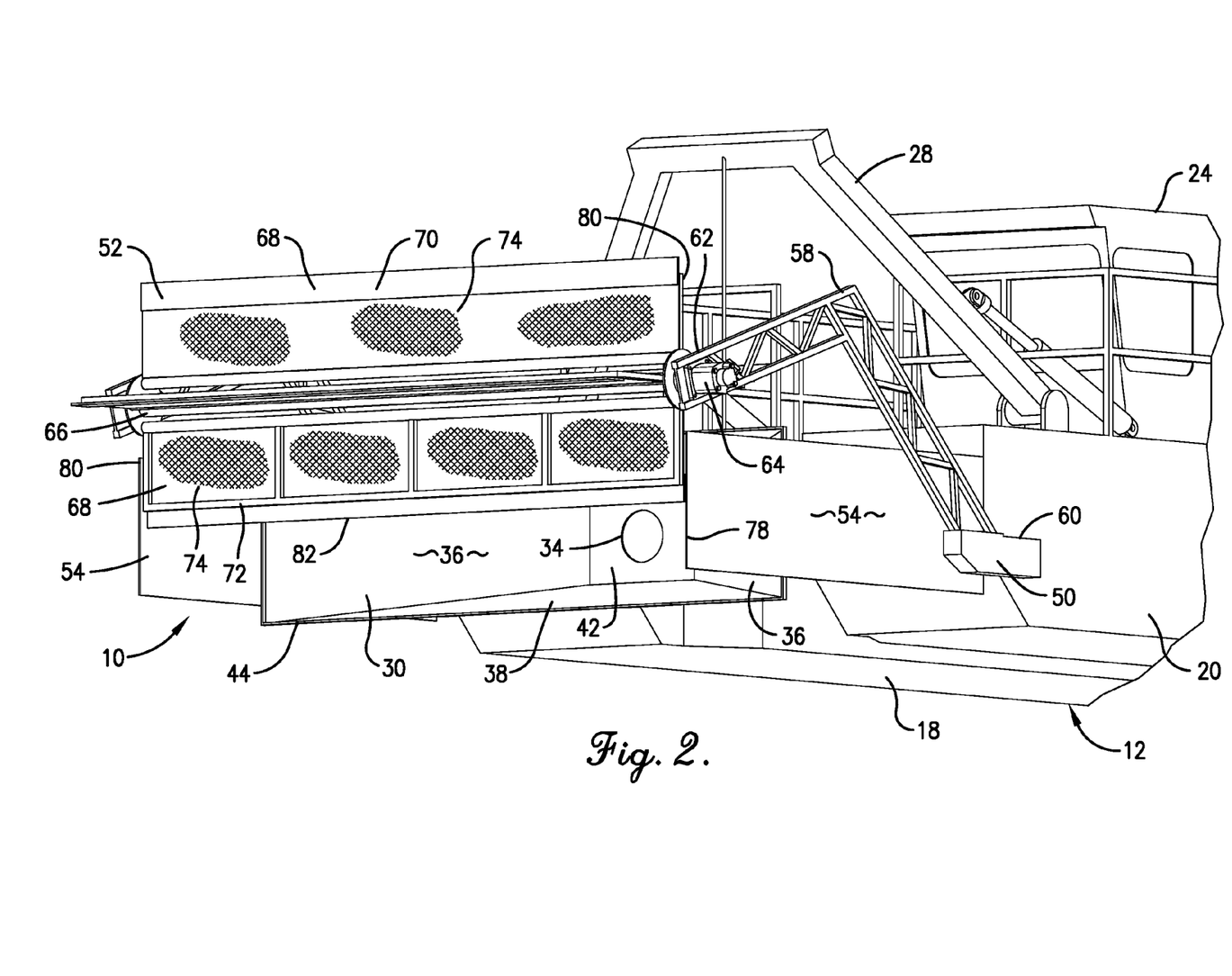
FIG. 2 is an enlarged, fragmentary right front isometric view of the watercraft mounting the floating debris harvesting system of FIG. 1, showing a hopper having an opening to permit the passage of water and debris therethrough positioned rearwardly of a rotatable motive member for engaging floating debris and two forwardly extending deflectors mounted to a hull of the watercraft.
Figure 3:
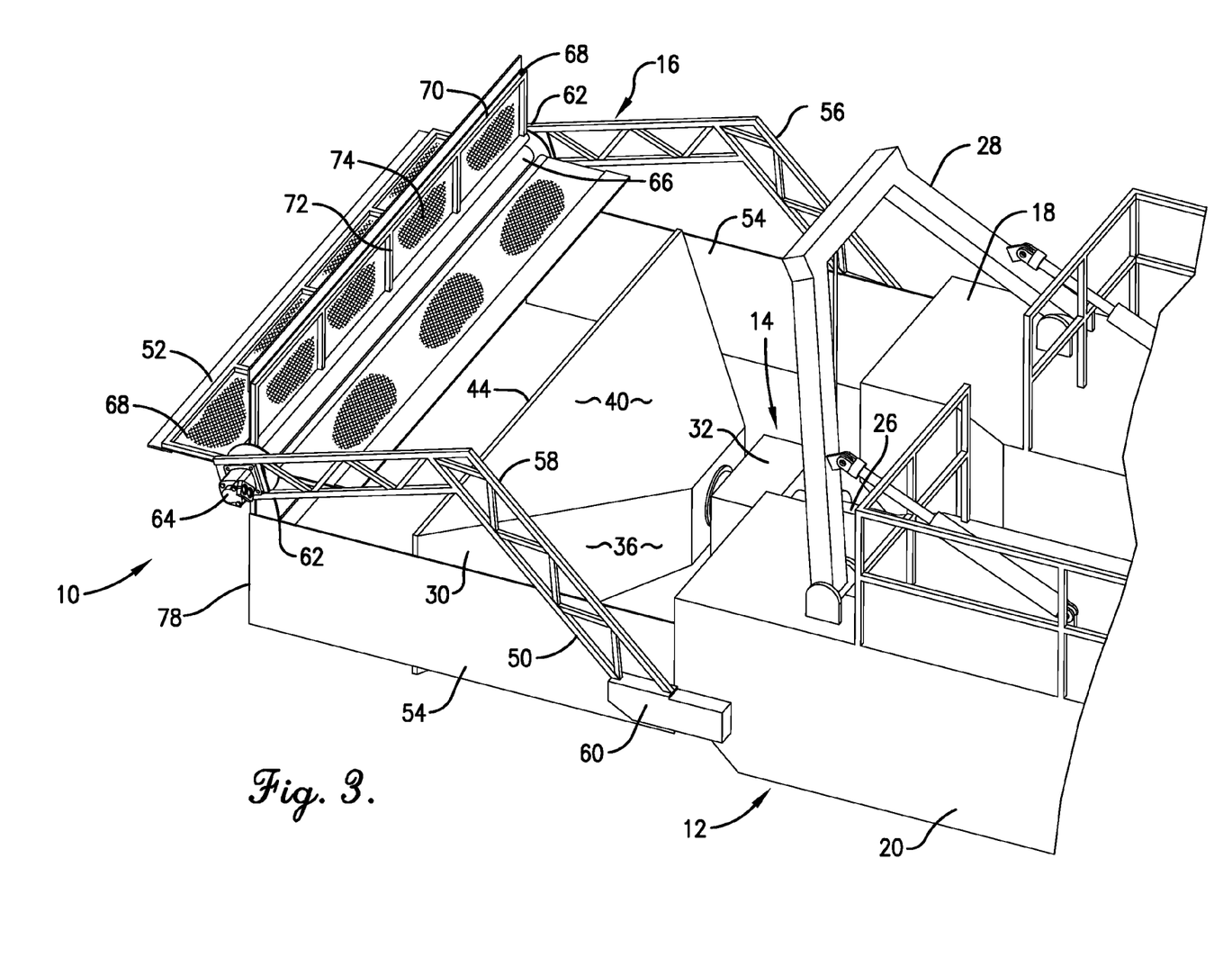
FIG. 3 is an enlarged fragmentary right top isometric view of the watercraft mounting the floating debris harvesting system of FIGS. 1-2, showing a carrier mounting the motive member forwardly of the hopper.
Figure 4:
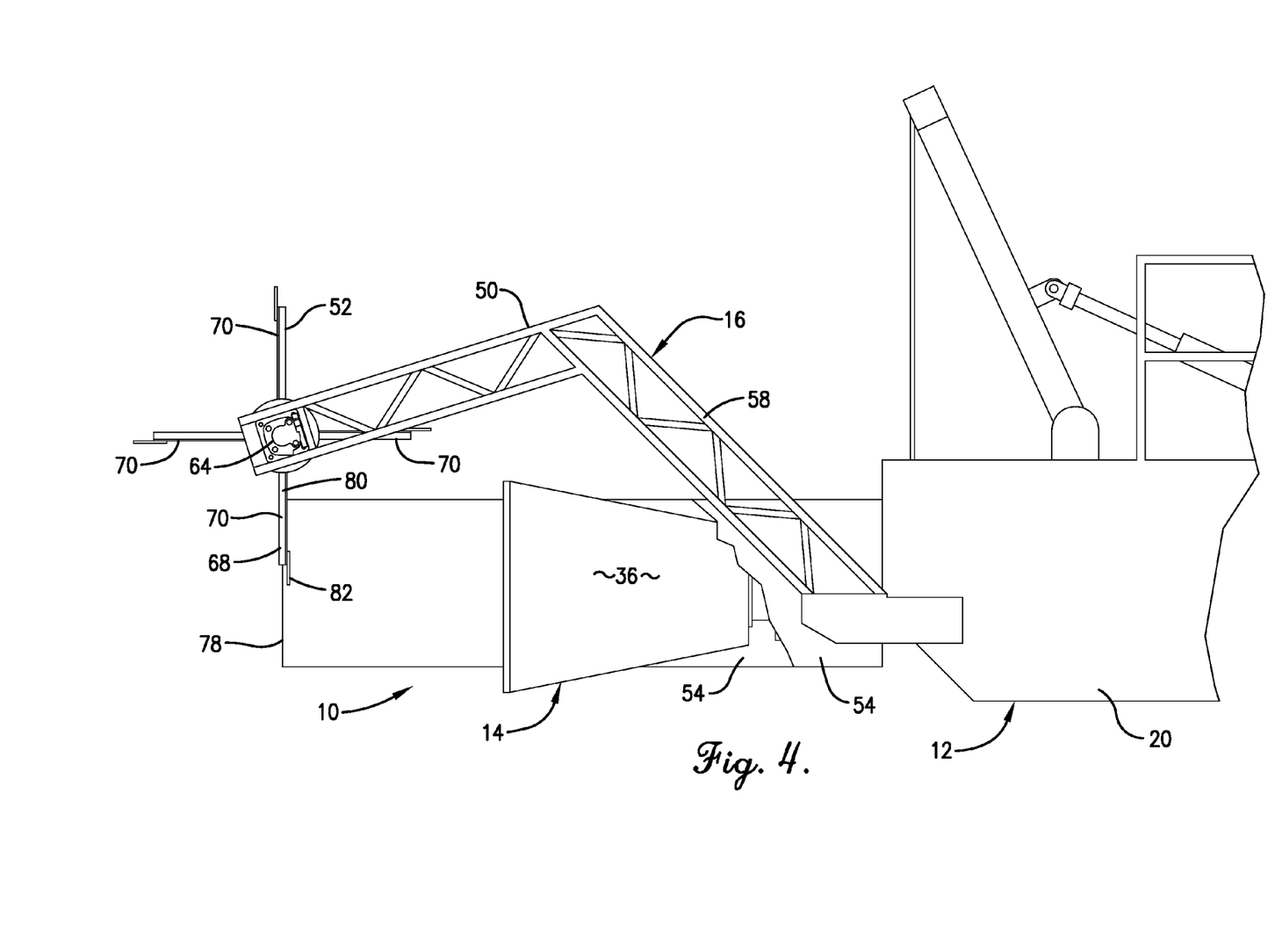
FIG. 4 is a fragmentary right side elevational view of the watercraft mounting the floating debris harvesting system of FIGS. 1-3, with portions of a right side deflector broken away to show the positioning of the carrier and the positioning of the hopper rearwardly of the motive member.
Figure 5:
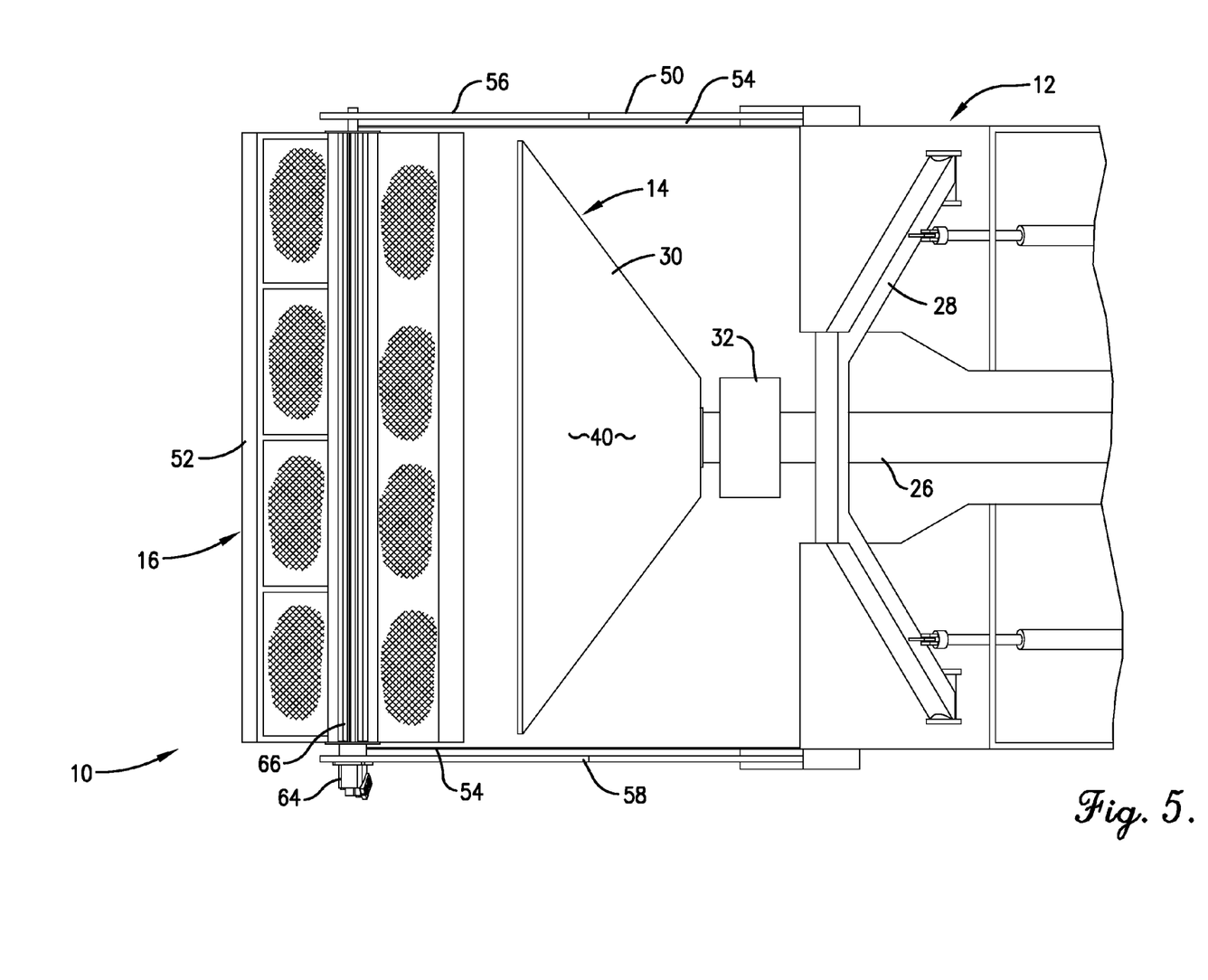
FIG. 5 is a fragmentary top plan view of the watercraft mounting the floating debris harvesting system of FIGS. 1-4, showing a boom and the hopper with a pump positioned therebetween and the rotatable motive member positioned forwardly of the opening of the hopper.

As illustrated in the drawings, embodiments of the present invention may also provide for a plurality of deflectors 54 to be included as part of system 10. The deflectors 54 may be mounted to the bow end of each of the pontoons 18 and 20 and extend forwardly past the hopper 30 and preferably at least as far forward as the central shaft 66. The deflectors are each positioned to extend longitudinally along the direction of travel of the watercraft 12, i.e. substantially parallel to the generally fore-and-aft extending axis of the boom 26. Thus, as illustrated in FIG. 2, when the lowermost of the panels 70 is in a vertical plane, the forward edge 78 of the deflectors 54 will most preferably be positioned laterally adjacent and immediately outboard each of the side edges 80 of the panels 70. The deflectors 54 are most preferably imperforate to limit and avoid entanglement with debris, and preferably extend below the surface of the water and extend downwardly at least as far as the remote edge 82 of the lowermost of the panels 70 when such panel 70 is in a vertical plane.

In use, the watercraft 12 is moved along the surface of the water either under its own source of propulsion or by external positioning such as the cable arrangement as noted herein. The operator energizes the pump 32 to begin drawing water into the hopper 30 and through the port 34 so that the pump 32 may pump water and any captured solids through the boom 26 and out a hose attached to the boom. The pump 32 is configured to macerate and chop solid materials. For example, if a plastic bottle or sandal is floating on the surface of the water, the pump 32 is capable of macerating and chopping that item for conveyance through the boom. The boom 26 may be raised or lowered to permit the operator to vertically position the hopper 30 in a location which is most advantageous for receiving and funneling the encountered floating debris rearwardly through the port 34 and into the pump 32.

As the watercraft 12 moves forwardly, the operator may engage the hydraulic motor 64 to begin moving (here rotating) the motive member 52. The motive member 52, being preferably perforate, engages floating debris and moves it rearwardly into the funnel-shaped hopper 30, while preferably allowing water to pass through the panels 70. This conserves power usage both by the hydraulic motor 64 and the pump 32 by limiting the amount of water directed into the hopper by the motive member 52. The operator may select the appropriate speed of rotation of motive member 52, depending on the quantity and content of the debris being encountered and processed. In addition, the operator may elect to pause the rotation of motive member 52 if desired. Furthermore, the arms 56 and 58 may be raised or lowered to permit the operator to vertically position the motive member 52 in a location which is most advantageous for directing encountered floating debris rearwardly to the hopper 30. The deflectors 54 provide an important benefit by impeding lateral escape of debris past the hopper 30. When used, the optional shield 48 may be positioned to deflect debris which may be thrown by the motive member 52 in a downwardly direction into to the opening of the hopper 30.

As such, embodiments of the present invention provide for a method of removing floating waterbourne debris. The method includes the initial step of providing a watercraft 12, such as a dredge, having a debris removal apparatus 10, with the apparatus 10 comprising a motive member 52 including one or more radially extending and circumferentially spaced guides 68 for directing debris, a hopper 30 including an opening adapted to receive debris directed by the motive member 52, and a pump 32 in fluid communication with the hopper 30 for transporting the debris received from the hopper 30 to a remote location. In a next step, the guides 68 of the motive member 52 are placed in engagement with the surface of the water. Next, the hopper 30 is positioned such that the hopper's 30 opening is at least partially submerged below the surface of the water, with it being understood that the positioning of the hopper 30 is performed separately from the placing of the guides 68. A next step includes rotating the motive member 52 to allow the guides 68 to contact and rearwardly direct floating debris on the surface of the water. Next, the floating debris is directed into the hopper 30 through the opening in the first end thereof. Finally, the floating debris is passed through the hopper 30 and into the pump 32.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An apparatus for removing floating waterbourne debris, comprising:
    a capture section including a carrier and a motive member mounted on the carrier, and further including at least one deflector, the motive member adapted to contact and direct floating debris rearwardly; and
    a collection and pumping section positioned rearward of the capture section for collecting and removing floating debris directed from the capture section, the collection and pumping section including:
        a hopper having opposed first and second ends, the first end thereof positioned adjacent the motive member and comprising an opening configured to be at least partially submerged below the surface of the water such that the opening is adapted to receive floating debris directed by the motive member, and the second end presenting a port for passing debris therethrough, and
        a pump mounted to the second end of the hopper adjacent the port and in fluid communication with the hopper for transporting the debris received from the hopper to a remote location,
    wherein the deflector extends rearwardly from adjacent the motive member to a location proximate the hopper.

2. An apparatus as set forth in claim 1, wherein the motive member is rotatably mounted on the carrier.

3. An apparatus as set forth in claim 2, wherein the motive member comprises a plurality of radially extending and circumferentially spaced guides.

4. An apparatus as set forth in claim 3, wherein the guides comprise perforate blades adapted to capture and guide debris while allowing at least a portion of water or other liquid to pass therethrough.

5. An apparatus as set forth in claim 1, wherein the capture section further includes a motor for rotating the motive member.

6. An apparatus as set forth in 5, wherein the motor has variable speeds.

7. An apparatus as set forth in 1, wherein the opening presented in the first end of the hopper is larger than the port presented in the second end of the hopper.

8. An apparatus as set forth in 1, wherein the carrier is fixedly mounted to a watercraft or the like.

9. An apparatus as set forth in 1, wherein the collection and pumping section is moveably mounted to a watercraft or the like, such that the collection and pumping section is operable to be selectively moved relative to the surface of the water.

10. An apparatus as set forth in claim 1, wherein the carrier is fixedly mounted to a watercraft or the like at a first mounting location, and the collection and pumping section is moveabley mounted at a second mounting location to the watercraft or the like to allow for selective movement of the collection and pumping section relative to the surface of the water, and wherein the first mounting location and the second mounting location are independent of each other.

11. An apparatus as set forth in claim 1, wherein the deflector is comprised of imperforate material to capture and further direct debris into the hopper.

12. An apparatus as set forth in claim 1, wherein the pump is operable to process debris by maceration, chopping or cutting, as the debris passes therethrough.

13. An apparatus as set forth in claim 1, further including an elongated shield positioned on a top portion of the hopper, such that the shield is adapted to capture debris directed upwardly by the motive member and redirect it downwardly into the hopper.

14. A system for removing floating waterbourne debris, comprising:
 a motive member including one or more radially extending and circumferentially spaced guides, with such guides comprising perforate blades adapted to capture and guide floating debris while allowing at least a portion of water or other liquid to pass therethrough, wherein said motive member is operable to direct floating debris rearwardly;
 a hopper positioned rearward of the motive member and comprising opposed first and second ends, the first end thereof positioned adjacent the motive member and comprising an opening configured to be at least partially submerged below the surface of the water such that the opening is adapted to receive floating debris directed by the motive member; and
 a pump mounted to the second end of the hopper and in fluid communication with the hopper for transporting the debris received from the hopper to a remote location.

15. The system as set forth in claim 14, wherein the system further includes a motor configured to rotate the motive member.

16. The system as set forth in claim 14, with the system further comprising at least one deflector extending rearwardly from adjacent the motive member to a location proximate the hopper.

17. The system as set forth in claim 14, wherein the hopper further includes a port located at the second end of the hopper, and with the opening being larger than the port.

18. A method of removing floating waterbourne debris comprising the steps of:
 (a) providing a watercraft having a debris removal apparatus, the apparatus comprising a motive member including one or more radially extending and circumferentially spaced guides for directing floating debris, a hopper positioned rearward of the motive member and comprising opposed first and second ends, the first end thereof positioned adjacent the motive member and including an opening configured to be at least partially submerged below the surface of the water such that the opening is adapted to receive floating debris directed by the motive member, and a pump mounted to the second end of the hopper and in fluid communication with the hopper for transporting the debris received from the hopper to a remote location;
 (b) placing the guides of the motive member in engagement with the surface of the water;
 (c) positioning the hopper such that opening is at least partially submerged below the surface of the water, wherein said positioning of step (c) is performed separately from the placing of step (b);
 (d) rotating the motive member to allow the guides to contact and rearwardly direct floating debris on the surface of the water;
 (e) directing the floating debris into the hopper through the opening in the first end thereof; and
 (f) passing the floating debris through the hopper and into the pump.

19. The method of claim 18, further including the step of: processing the debris as it moves through the pump by macerating, cutting, chopping or tearing the debris.

20. The method of claim 19, further including the step of: conveying the processed debris to a location remote from the water.

* * * * *